March 31, 1964 W. C. GRABAU 3,127,553
CONTROL SYSTEM FOR ENERGIZING A DIRECT-CURRENT
LOAD FROM AN ALTERNATING-CURRENT SOURCE
Filed Sept. 11, 1959 2 Sheets-Sheet 1

INVENTOR
William C. Grabau
BY
Moon and Hall
ATTORNEYS

INVENTOR
William C. Grabau

United States Patent Office 3,127,553
Patented Mar. 31, 1964

3,127,553
CONTROL SYSTEM FOR ENERGIZING A DIRECT-CURRENT LOAD FROM AN ALTERNATING-CURRENT SOURCE
William C. Grabau, Honolulu, Hawaii; Ebbe Grabau, executrix of William Christian Grabau, deceased, assignor to Precision Control Corporation, Garden Grove, Calif.
Filed Sept. 11, 1959, Ser. No. 839,350
11 Claims. (Cl. 321—39)

This invention relates to motor speed control systems and more particularly pertains to an electronic system for the control of speed of direct-current motors.

It is well-known in the prior art systems for controlling direct-current motors from a source of alternating current to employ electron discharge devices such as gas discharge tubes of the thyratron type. In these systems, alternating voltages commonly are applied to both the plate and grid of the thyratron, but the relative phase of these two voltages is varied so that a selective control can be exercised over the particular point in each positive half-cycle of the plate potential when the tube becomes conductive. In this way, the current supplied to the motor armature and thus its speed are selectively varied. In practice, these systems have had various shortcomings among which are a lack of precision in the control over the firing point of the gas discharge tube, and a difficulty in providing a smooth variation in the control exercised over a wide range of motor speed. This difficulty has arisen in part because the firing point of the gas discharge control tube has been affected, not only by the relative phase of the grid and plate voltages, but also by variations in amplitude and wave shape of the grid voltage. These shortcomings have been evidenced particularly by an inability in such systems to maintain motor speed to a high degree of accuracy over wide ranges of load and over a wide range of speed settings. In addition, these prior art systems have frequently been ineffective to produce effective and rapid control of motor speed in the event of an overload or a stalling of the motor armature. Moreover, in these systems, it has frequently been impossible to fire the rectifying gas tube substantially at the beginning of each positive plate voltage pulse so that maximum energization of the motor armature could not be obtained.

To overcome these various drawbacks of the prior art systems, there has been devised by means of the present invention a system of speed control for direct-current motors which does not depend at all upon any variation in phase of the grid voltage to effect control of motor speed. Rather, the gas control tube is provided, according to this invention, with a grid voltage whose phase constantly remains fixed. More specifically, the grid voltage comprises a waveform of voltage which comprises a plurality of components: One of these components is a basic waveform which is unvarying from one cycle to the next. Superimposed upon this basic waveform is an alternating voltage signal, preferably of relatively high frequency as compared to the frequency of the supply source, and this higher frequency component, in effect, modulates the basic waveform. The amplitude of this modulating signal is constant but also controllable, and its amplitude determines the firing point of the gas discharge tube thereby effecting control of motor speed.

As will appear from the description that follows, certain other highly desirable features accrue from the novel circuit organization of this invention. Among these advantages are the highly accurate speed regulation occurring over exceptionally large variations in load, in selected speed value, and in line voltage. Moreover, reversing means including a switch is provided having contacts which carry no current at the instant they are operated to effect a reversal.

It is an object of this invention to provide a direct-current motor speed control system employing gas discharge tubes wherein the grid voltage of the control gas discharge tube is fixed in phase with respect to the plate voltage.

It is another object of this invention to provide a motor speed control system wherein the grid voltage of the gas discharge tube supplying the motor armature current comprises two voltage components, one being superimposed upon the other.

It is a further object of this invention to provide a motor control system for direct-current motors wherein the control voltage for the gas discharge tube supplying the motor armature current is comprised of two voltage components, one modulating the other and with the modulating voltage being of variable amplitude.

It is another object of this invention to provide a motor control system for direct-current motors having a control for the armature current as set forth in the foregoing objects and wherein there is further provided a novel means for controlling said armature current in the event of an overload of said motor.

Another object of this invention is to provide an electronic motor control system including reversing means comprising switch contacts which have no current flowing through them at the time they are switched from one position to the other, thereby greatly increasing the life of such contacts.

Further objects, purposes, and characteristic features of the invention will be obvious from the following description and will in part be pointed out as the description of the invention progresses.

In describing this invention in detail, reference will be made to the accompanying drawings wherein.

Figure 1:
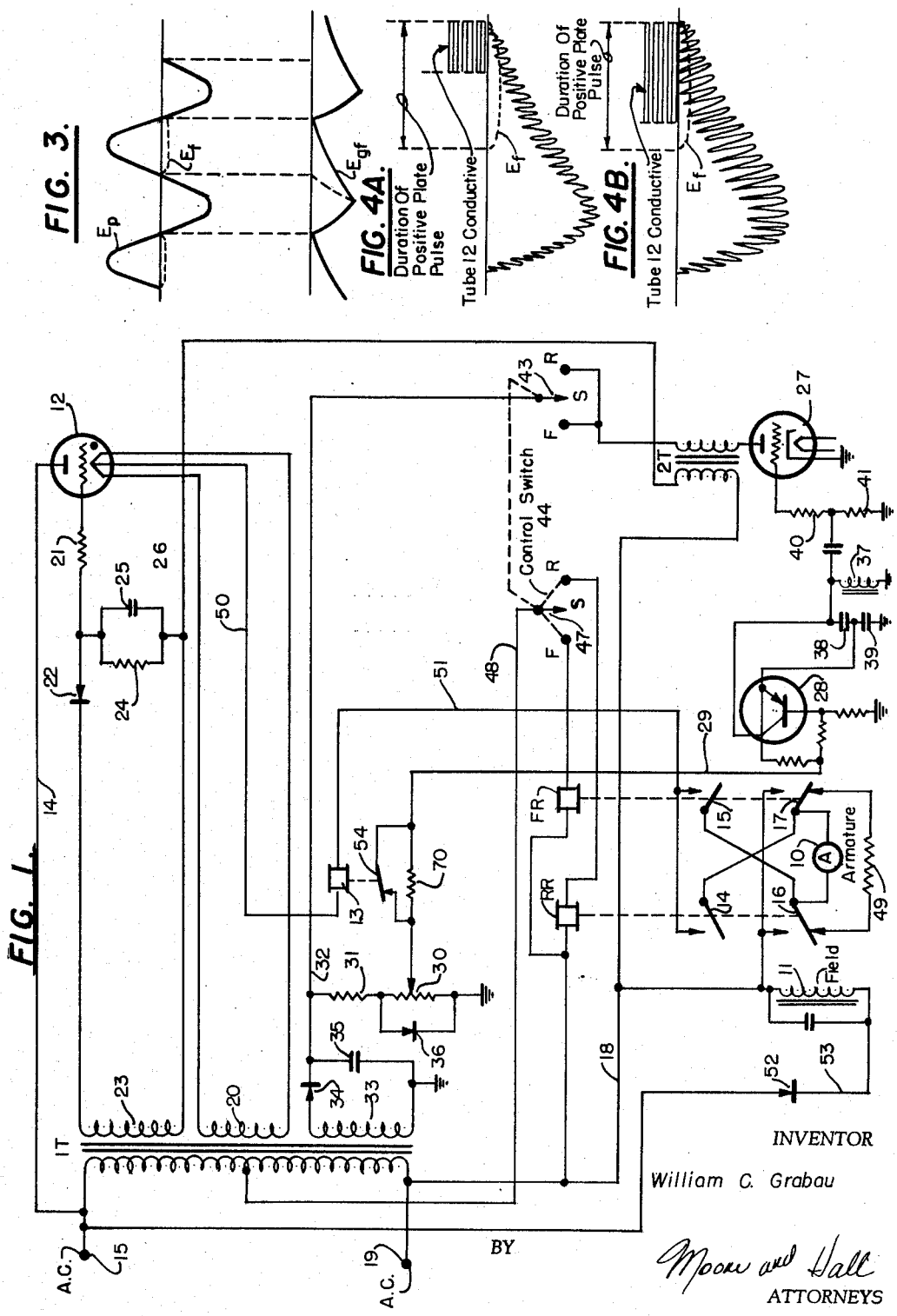
FIG. 1 is a circuit diagram of one embodiment of this invention providing half-wave rectification of the motor armature current.

FIGS. 3, and 4A and 4B illustrate waveforms of the plate and grid voltages of the control gas discharge tubes under different circumstances.

Described briefly, the present invention includes one or more gas discharge tubes which may be of the thyratron type and which rectify the alternating current from the power source to provide direct current for the armature winding of the motor being controlled. The alternating voltage of the source is applied between the plate and cathode of the thyratron rectifier, and the armature of the motor is connected in series with the plate-cathode circuit. Where only a single thyratron rectifier is used, there can be only half-wave rectification of the armature current, but the use of two such tubes provides for the supply of full-wave rectified current to the motor armature. The amount of current supplied to the motor armature and thus the motor speed is directly controlled by varying the point at which the thyratron is fired on each half-cycle of the plate-cathode voltage that causes the plate to be positive with respect to the cathode, it being understood that gas discharge tubes remain conductive when once rendered conductive until the plate-cathode potential is so reduced that conduction can no longer be sustained. More specifically, if the grid voltage is made to cause the tube to become conductive only during the latter portion of each half-cycle that the plate is positive, then a relatively low value of current is supplied to the motor armature, but if the grid causes the tube to become conductive early in each such half-cycle, a higher value of armature current is supplied.

It is contemplated by the present invention that the grid voltage of the thyratron rectifier tube will comprise a basic voltage waveform which is of the same amplitude and wave shape from one cycle to the next and of fixed phase with respect to the plate voltage. Variation in the firing point of the tube is then obtained by superimposing upon this fixed grid voltage component an alternating voltage component of much higher frequency and with a controllable amplitude. The fixed component of the voltage is a maximum at the beginning of each half-cycle that the plate voltage is positive with respect to the cathode, but this fixed component decreases in a known manner during the time of such half-cycle. There finally comes a time in each half-cycle when the two components of the grid voltage added together cause the negatively biased grid to be raised in potential to the firing level at which time the tube will then fire and remain conductive throughout the remainder of the half-cycle. The greater the amplitude of the modulating voltage, the sooner will the two components of grid voltage raise the grid voltage to the level where the tube can be fired. If the modulating component of voltage is made of sufficiently large amplitude, the tube will fire substantially at the very beginning of the cycle of positive plate voltage. It may thus be said that the grid voltage is driven positively in a rapidly alternating manner and that this continues, with the fixed or modulated component steadily becoming of lower amplitude until a point is finally reached where a positive peak of the modulating grid voltage will finally cause the grid to reach the firing level of the tube, at which time the tube immediately becomes fully conductive.

In FIG. 1, the direct-current motor being controlled by the system is diagrammatically illustrated by the armature 10 and field winding 11. As will later be described in detail, the armature is supplied by rectified current obtained from the center tap of the filament winding of a grid-controlled gas discharge rectifier tube 12 which may be of the thyratron type. This rectified current is supplied to the armature through the winding of an overload control relay 13. Tube 12 is energized from the A.C. source by having its plate connected over wire 14 to the terminal 15 of the A.C. source. The filamentary cathode of tube 12 is connected through the winding of relay 13 as previously described, through the various contacts 14–17 of the reverse and forward control relays RR and FR, respectively, and over wire 18 to the opposite terminal 19 of the A.C. source. The heater of tube 12 is energized by being connected to the terminals of the secondary winding 20 of transformer 1T.

The control grid of tube 12 is connected through a current-limiting resistor 21 and a diode 22 to the upper terminal of the secondary winding 23 of transformer 1T. A resistor 24 and capacitor 25 are connected in parallel between the junction of resistor 21 and rectifier 22 and to the wire 26 which connects to the lower terminal of secondary winding 23. On each half-cycle of the alternating-current supply that causes the upper terminal of winding 23 to become negative with respect to the lower terminal, the capacitor 25 charges negatively through rectifier 22 in the forward or low resistance direction. Capacitor 25 becomes charged to the peak value of the transformer secondary voltage and, as this secondary voltage decreases in amplitude from the negative peak value, the charge on capacitor 25 tends to be maintained since this capacitor discharges relatively slowly with the result that the rectifier 22 becomes non-conductive. Throughout the remainder of the negative half-cycle, the capacitor 25 can discharge only through the parallel resistor 24, and the time constant of this circuit is such that the voltage across capacitor 25 discharges exponentially toward zero, becoming substantially discharged at the beginning of the subsequent negative half-cycle.

This operation is illustrated in FIG. 3 wherein the waveform designated $E_p$ indicates the voltage appearing between plate and cathode of tube 12. Proper polarities are observed to cause the upper terminal of secondary winding 23 to be positive at the same time that terminal 15 is positive so that the waveform $E_{gf}$ properly designates the voltage appearing across capacitor 25 and thus represents the aforementioned fixed component of the voltage appearing in the grid-cathode circuit of 12. The capacitor is shown as being charged negatively on each negative half-cycle until the negative peak voltage is reached. From such time until the beginning of the next half-cycle, the voltage decays toward zero only at a relatively slow rate by reason of the fairly long time constant provided for the discharge of capacitor 25 through resistor 24, and since it is continuously more negative than the charging voltage throughout this time, the rectifier 22 remains cut off.

The grid cathode circuit of tube 12 extends not only through the aforementioned components comprising capacitor 25 and resistor 24 in parallel, but also includes the secondary winding of a transformer 2T whose primary winding is energized by the plate current of a triode 27. The circuit is completed by the connection of the lower terminal of this secondary winding over wire 18 to the terminal 19 of the A.C. power source. This circuit organization provides that the grid-cathode voltage of tube 12 will be affected not only by the voltage across capacitor 25 which varies in the manner just described, but also according to the voltage induced in the secondary winding of transformer 2T. The manner in which this secondary voltage varies will subsequently be described in detail.

The input to the grid of tube 27 is obtained from a transistor oscillator which includes transistor 28. A conventional circuit organization is provided for this oscillator, and it will be appreciated that various types of oscillators might be used for the present purpose and that it is not material to the present invention as to the type of oscillator used, nor whether a transistor or a conventional vacuum tube is used. The energization for this oscillator is provided by a connection over wire 29 and through normally closed contact 54 of relay 13 to the variable tap on a potentiometer 30.

This potentiometer 30 is connected in series with a resistor 31 from the wire 32 to ground. A direct-current voltage appears on wire 32 by reason of the rectification of the alternating voltage of the secondary winding 33 provided by the diode 34. The rectified voltage is filtered by a capacitor 35. A Zener diode 36 is connected in parallel with potentiometer 30 to stabilize the voltage across this potentiometer and prevent undesirable fluctuations which would otherwise occur in response to line voltage variations. Variation of the position of the tap on potentiometer 30 has the effect of varying the amplitude of the direct-current voltage applied to the collector and emitter of transistor 28, and this, in turn, produces corresponding variation in the amplitude of the alternating-current output of this transistor oscillator.

The frequency of operation of the oscillator is determined principally by the component values of the inductor 37 and capacitors 38 and 39, and these are selected to produce a frequency preferably considerably higher than that of the alternating current supplied. Thus, in one specific embodiment of this invention, the oscillator was organized to provide an output frequency in the order of 2,000 cycles per second where the alternating supply frequency was the customary 60 cycles. However, it will be understood that other frequencies can as well be used and that the invention is by no means limited to the use of this particular frequency.

The alternating output of the transistor oscillator is applied through the voltage dividing resistors 40 and 41 to the control grid of tube 27. The plate of this tube is selectively connected through contact 43 of control switch 44 to wire 32 which is energized with direct current as described above. Specifically, when movable contact 43 of control switch 44 is in either the right- or left-hand positions corresponding respectively to the reverse and forward direction of rotation of the motor, the plate of tube 27 is connected through the primary winding of transformer 2T, and through contact 43 to wire 32.

With the plate-cathode circuit of tube 27 energized in this manner, there is induced in the primary winding of transformer 2T an alternating voltage which corresponds to the alternating voltage appearing on the grid of tube 27 and a similar voltage then appears across the secondary winding of this transformer 2T as well. The amplitude of this secondary voltage which is at the frequency of the output of the transistor oscillator, is then regulated entirely in accordance with the level of direct voltage on wire 29 which, in turn, is dependent upon the position of the tap of potentiometer 30. Merely by moving the tap of this potentiometer up and down, the voltage induced in the secondary winding of transformer 2T may be increased or decreased respectively.

This transformer secondary voltage is in series with that across capacitor 25 and is superimposed upon such voltage in the manner generally illustrated in FIGS. 4A and 4B. Comparing FIGS. 4A and 4B makes it clear that the greater the amplitude of the voltage across the secondary winding of transformer 2T, the sooner will the grid voltage of tube 12 reach the firing potential of the tube indicated by the waveform $E_f$. The amplitude of the higher frequency component may be varied very gradually and precisely so that the point at which tube 12 fires on each alternate half-cycle may be very accurately controlled, yet this is accomplished by varying only the amplitude of a relatively small grid voltage signal without in any manner varying its phase relationships.

The two relays RR and FR together not only selectively energize the motor armature but also select the polarity of the armature energization to control thereby the direction of rotation of the motor. These two relays are selectively energized by the contact 47 of control switch 44 which is ganged, as indicated with the contact 43 of this switch. The movable contact 47 is connected to the center tap of the primary winding of transformer 1T. When the switch contact 47 is in the left-hand or F (Forward) position, wire 48, which leads from the center tap of the primary winding of transformer 1T, is connected through this contact 47 and through the winding of relay FR to the lower terminal of the primary winding. Similarly, with the contact 47 in its right-hand or R (Reverse) position, a similar circuit is provided to energize relay RR. Both of these relays RR and FR are, of course, alternating-current relays and are both normally de-energized when the switch contact 47 is in the S or "Stop" position shown in the drawing.

When control switch 44 is in the normal or "Stop" position S, both relays RR and FR are dropped away so that the armature 10 of the motor is connected in parallel with a resistor 49 through the back contacts 16 and 17 of relays RR and FR, respectively. This resistor 49 provides for dynamic breaking of the motor armature when the switch is first operated to the Stop position, and this ensures that the armature will quickly stop its rotation.

If the switch 44 has been operated to the right-hand or "Reverse" position to thereby energize the reverse relay RR, the rectified current provided by tube 12 over wire 50, and through the winding of relay 13 and wire 51, is applied through front contact 14 of relay RR, through the armature 10 from right to left, through front contact 16 of relay RR, and over wire 18, to the terminal 19 of the A.C. power source. On the other hand, when switch 44 has been operated to the left-hand or "Forward" position so that the forward relay FR is picked up, then the rectified plate current of tube 12 flowing in wire 51 passes through front contact 15 of relay FR, through armature 10 left to right, through front contact 17 of relay FR, and over wire 18, to the same terminal 19. It will be observed from this description, that the direction of current through the armature 10 will thus be either from right to left or left to right depending upon whether relay RR or FR is picked up, and this selects the direction of rotation of the armature.

As described generally above, the reversing circuit comprising switch 44 is organized so that the heavy motor armature current is not flowing through the contacts which effect the reversal at the time such contacts are operated from one position to the other. More specifically, assume that the switch 44 has been operated from the Reverse position to the Forward position. In the instant that the rotatable contact 43 is moved from position where it makes contact with the right-hand fixed contact point, the plate circuit of tube 27 is opened. As described above, this ensures that there can be no modulating component induced in the secondary winding of transformer 2T with the result that tube 12 is then rendered substantially incapable of being rendered conductive since only the fixed component of voltage $E_{gf}$ appears on the grid and this does not permit the grid to reach the firing potential $E_f$. In this connection, it should be understood that switch 44 is of the type which cannot be operated from the Forward to the Reverse position without stopping at the Stop or Center position. At the same time that the just-described events occurred, the relay RR is de-energized, but there is a delay of several milliseconds before the previously closed contacts 14 and 16 of relay RR are opened and the reason for this delay is that it takes at least this long following the de-energization of relay RR before the front contacts of this relay are opened. In the meantime, the current supplied to the armature from tube 12 has ceased as a result of the operation of the switch contact 43 in the manner described above so that there is no armature current flowing through the contacts 14 and 16 at the time they are opened.

The field winding 11 of the motor is connected across the alternating current terminals 15 and 19 through the diode 52 which thereby provides half-wave rectification of the field current. The capacitor 53 connected in parallel with the field winding filters the rectified current so that a relatively smooth unidirectional current flows through the field winding.

From the description previously given, it is apparent that the entire armature current of the motor passes through the winding of relay 13. This relay is designed in such a manner that any value of armature current below that considered to be excessive and calling for corrective action will not cause this relay 13 to be picked up. For the entire range of normal armature current values, therefore, the relay remains in the position shown in FIG. 1. Its contact 54 is thus normally closed to provide a direct connection of wire 29 to the movable tap on potentiometer 30. When there is an overload, the armature current increases correspondingly until, at some pre-determined value, the armature current will be of sufficient amplitude to energize relay 13 and cause its back contact 54 to open. When this occurs, the normally effective shunt on resistor 70 is opened. This resistor has a high value of resistance, and when it is unshunted in this manner the voltage applied over wire 29 to the transistor oscillator is considerably reduced in amplitude. The effect of this is to cause the output of the oscillations produced by the oscillator to be considerably reduced in amplitude. The oscillator signal that is normally induced in the secondary winding of transformer 2T is then also reduced in amplitude, thereby causing the grid voltage of tube 12 to reach the critical firing level of this tube only at some point later in the positive half-cycle of plate voltage. The tube is therefore conductive for a shorter period of time on each half-cycle so that the armature curent is substantially reduced.

Thus, the picking up of relay 13 in response to an overload condition has the effect of correcting for such overload, and when the situation has been corrected, relay 13 is again restored to its normal dropped-away condition. However, if the condition still persists, relay 13 is again picked up. It follows then that where there is a steady overload condition, the relay 13 will tend to oscillate between its two respective conditions, i.e., it will aternatively pick up and drop away, and each time it is picked up, a corrective influence is exerted to reduce the current supplied to the motor armature.

For slight overload conditions, the above oscillatory operation of relay 13 will occur relatively quickly since the winding of relay 13 will be energized with current values only slightly in excess of those required to pick it up. However, when there is a severe overload condition, the winding of relay 13 is energized with a high level of current. Because of this, relay 13 then tends to remain picked up more of the time and is then correspondingly effective for a greater portion of the time to exert its corrective influence with respect to the curent supplied to the motor armature. For exmaple, it was found in one embodiment of this invention that with a slight overload condition, relay 13 operated approximately 20 times per second, but with heavy overload conditions relay 13 operated only approximately five times per second and this slower rate of operation came about because the relay tended to remain picked up for longer periods of time when once picked up, and when dropped away, was quickly again picked up. It may thus be said that the relay 13 operates in a vibratory manner and has the effect of producing a chopping action as a result of which severe current surges are limited and instead a gradual, rapid limiting control is effected.

The armature winding of the motor is connected in series with the cathode of tube 12 and thus appears also in the grid-cathode circuit of this tube. Because of this, the counter E.M.F. generated in the motor armature is instrumental in affecting the grid bias voltage of tube 12 since it acts directly to raise the potential on the cathode of tube 12 and thereby increase the negative grid bias on this tube. More specifically, when the motor is first started, the counter E.M.F. is substantially zero so that the negative grid-cathode bias voltage is at a minimum value and the modulating voltage will then quickly raise the grid voltage to the critical firing level on each positive plate half-cycle of voltage. At such times, therefore, maximum current is provided for the motor armature so that high starting torque is supplied. It will be appreciated that, even though the bias or fixed component of grid voltage $E_{gf}$ causes the grid to be below the critical firing level at the beginning of each cycle, under the starting conditions when the counter E.M.F. is very low, the modulating voltage of higher frequency will drive the grid of tube 12 to the critical firing level substantially at the very beginning of the positive plate pulse so that the maximum armature current is provided for motor starting.

On the other hand, as the armature picks up speed, the counter E.M.F. generated therein raises the cathode potential of tube 12 so that the modulating voltage causes tube 12 to fire at a continually later time following the beginning of each positive plate pulse until finally an equilibrium state is reached when the time of firing in each half-cycle of positive plate voltage is determined by the amplitude of the modulated voltage. However, the fact that the counter E.M.F. appears in the grid-cathode circuit is instrumental in providing the high degree of speed regulation achieved. Thus, any speed variation which might occur after the above-described equilibrium condition is achieved, will vary the cathode potential in such a direction that the tube will fire at either a later or an earlier time in the cycle, depending upon whether the speed has increased or decreased, respectively, and the variation in armature current that results from this variation in firing time corrects for the speed change which is experienced. A very accurate speed control is maintained in this manner; in one embodiment of this invention, it was found that the speed of the motor could be controlled to within plus or minus 1% from no load to full load.

Figure 2:
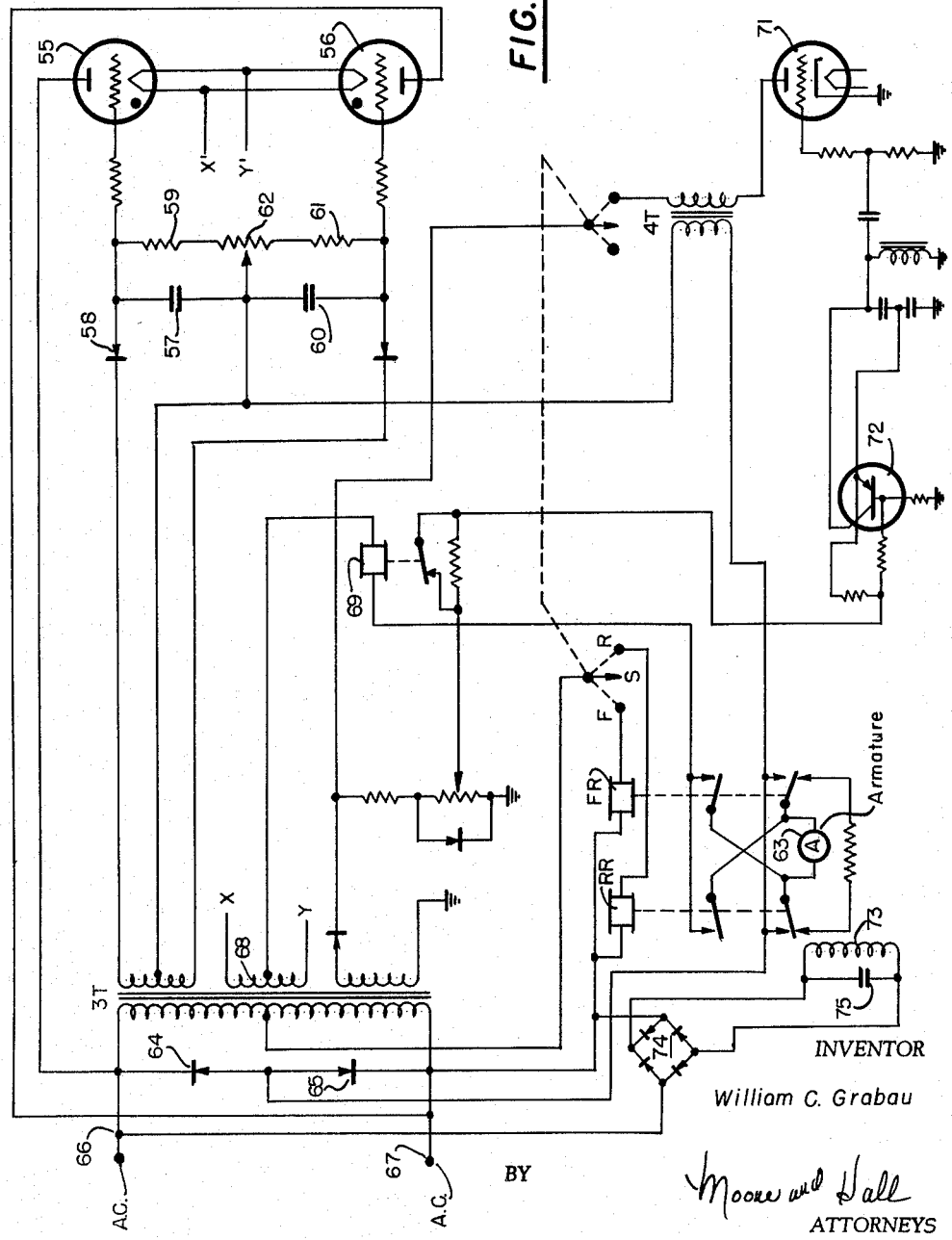
FIG. 2 is a circuit diagram of a second embodiment of this invention wherein full-wave rectification of the motor armature current is provided.

In the embodiment of the invention shown in FIG. 2 full-wave rectification of the motor armature current is provided. Two control thyratrons 55 and 56 are provided and the plates of these two tubes are respectively connected to the upper and lower terminals of the primary winding of transformer 3T. The control grid-cathode circuit of each tube 55 and 56 is similar to that provided for thyratron tube 12 of FIG. 1. More specifically, the capacitor 57 becomes negatively charged on each half-cycle that the plate voltage of the associated tube 55 is driven negatively. When the applied voltage decreases from its most negative value, the associated rectifier 58 becomes nonconductive and capacitor 57 can then discharge only through the resistor 59 which is connected in parallel with it. A similar circuit including capacitor 60 and parallel resistor 61 is provided for the grid circuit of the thyratron tube 56. A potentiometer 62 is connected in series between the fixed resistors 59 and 61 to provide a balance control. Movement of the tap on the potentiometer affects simultaneously and oppositely the amount of resistance in parallel with each of the capacitors 57 and 60, respectively. Movement of this tap, therefore, can be effective to cause the fixed or basic component of voltage in the grid circuits of the tubes 55 and 56 to be of almost exactly the same amplitude and wave shape.

In a manner comparable to that described in connection with FIG. 1, the junction of capacitors 57 and 60 is connected through the secondary winding of transformer 4T, through the various pole-changing contacts of the relays RR and FR, and through the armature winding 63 to the junction of the two rectifiers 64 and 65 which are connected back-to-back across the terminals 66 and 67 of the A.C. supply. On each half-cycle of the A.C. supply that terminal 66 is positive with respect to terminal 67, tube 55 is fired and current then flows from terminal 66 through the plate-cathode circuit of tube 55 which includes the secondary winding 68 of transformer 3T, through the center tap of this winding 68, the winding of relay 69, the contacts of relays FR and RR which determine the direction of current flow through armature winding 63, and through rectifier 65, to the terminal 67. On the alternate half-cycles when terminal 67 is of positive polarity with respect to terminal 66, the flow of current is through a comparable circuit which now includes thyratron tube 56 rather than 55 and includes the diode 64 rather than diode 65.

From the description previously given in connection with FIG. 1, it can be seen that the tube 71 is effective in the same manner in this FIG. 2 to control the modulation of the basic waveform of grid voltage $E_{gf}$ by the higher frequency modulating signal. In addition, the oscillator comprising transistor 72 operates in the same manner as the corresponding oscillator of FIG. 1 which comprises transistor 28. The relay 69 controls the amplitude of voltage applied to transistor 72 in a manner that is obvious from the previous description as well.

The energization of the field winding is in this FIG. 2 also provided by full-wave rectification of the power source. This is provided by a full-wave rectifier 74 whose input terminals are connected to the terminals 66 and 67 of the A.C. source and whose output terminals are connected directly across the terminals of the field winding 73. Capacitor 75 acts as a filter capacitor to smooth the field current.

In both embodiments of this invention, the modulating voltage has been indicated as being a sine wave of relatively high frequency as compared to the alternating-current source of power. It will be obvious from the description that has been given that it is by no means essential that this modulating signal have sine wave characteristics and that it could as well be a saw-tooth wave of voltage or any other repetitive waveform preferably of a substantially high frequency as compared to that of the alternating-current power source. In the disclosed embodiment of the invention it is the output signal of the transistor oscillator that is made variable, whereas the basic voltage component provided by the discharge capacitor in the grid-cathode circuit is fixed. It is, nevertheless, considered to be within the scope of the modifications of this invention, which might be practiced by one skilled in the art, to have the output of the oscillator remain constant and instead control the amplitude of the voltage appearing across the capacitor.

Having described an electronic speed control system for direct-current motors as one specific embodiment of this invention, it should be understood that the particular embodiments are merely illustrative of my invention and that various modifications, adaptations and alterations may be made thereto without departing from the spirit or scope of this invention.

What I claim is:

1. Apparatus for controlling the current applied to a direct-current load device from an alternating-current source comprising in combination, at least one grid-controlled gas discharge tube having a plate-cathode circuit including in series connection said load device and said alternating-current source, first means for applying to the control grid-cathode circuit of said tube upon each positive half-cycle of the plate-cathode voltage a first signal voltage which is substantially more negative at the beginning of each said positive half-cycle than the firing grid-cathode voltage but thereafter becomes less negative throughout the remainder of said half-cycle, second means for applying to said control grid-cathode circuit a second alternating signal voltage which is superimposed upon said first voltage and has a frequency which is a multiple of said alternating-voltage, and control means for effecting continuous control of the amplitude of said second voltage, whereby said tube becomes conductive at a point in each of the successive of said positive half-cycles of alternating current voltage according to the amplitude of said second voltage as governed by said control means.

2. The combination defined in claim 1 wherein said second means comprises an oscillator generating an alternating signal with a frequency which is a substantial multiple of the frequency of the alternating-current source.

3. The combination defined in claim 1 wherein said second means comprises a transistor oscillator, and wherein said control means comprises a variable potentiometer for varying the supply of voltage to said transistors oscillator to thereby control the amplitude of its output signal.

4. A control system for energizing a direct-current load device from an alternating-current source comprising in combination, at least one gas discharge tube having a plate-cathode circuit including in series therewith said load device and said alternating-current source, said tube being of the type having a control grid having a known grid voltage firing characteristic indicative of the grid voltage level required to fire said tube on each positive half-cycle of the voltage applied between plate and cathode from said alternating-current source, first grid input voltage means for applying to said grid a first voltage component varying in a positive direction on each cycle of positive plate voltage so as to gradually approach said firing voltage, a second grid input voltage means for superimposing upon said first voltage component a second voltage component comprising an alternating voltage of relatively high frequency as compared to the frequency of said alternating-current source, and overload control means responsive to the level of current said plate-cathode circuit for reducing the normal amplitude of the voltage provided by said second grid input voltage means to a substantially lower value when said current exceeds a predetermined value, whereby in response to said current overload said last-named means causes said tube to become conductive at a later point in each positive half-cycle of plate voltage to thereby reduce the current in said plate-cathode circuit.

5. The combination defined in claim 4 wherein said overload control means comprises an electromagnetic relay and wherein said relay is actuated in response to current values representing an overload condition and the actuation of said relay is effective to reduce the amplitude of the signal generated by said second grid input voltage means.

6. The combination as defined in claim 5 wherein the input voltage to said oscillator is supplied thereto through a normally shunted resistor which becomes unshunted by the actuation of said relay in response to overload values of current to thereby reduce the amplitude of the output of said oscillator.

7. The combination according to claim 4 wherein said first grid input signal means comprises a capacitor being charged negatively on each negative half-cycle of plate voltage of said tube, resistance and rectifying circuit means associated with said capacitor for discharging said capacitor through said resistance during each positive half-cycle of said plate voltage, and means for connecting said capacitor in the grid-cathode circuit of said gas discharge tube.

8. In apparatus for energizing a load device with direct-current from an alternating-current source the combination comprising, at least one grid controlled gas discharge tube having a plate-cathode circuit including said load device and said alternating-current source in series, said tube being of the type having a control grid with a known grid voltage firing characteristic indicative of the voltage level required to fire said tube on each positive half-cycle of the voltage applied between plate and cathode from said alternating-current source, a grid-cathode circuit for said tube, means responsive to said alternating-current source for applying to said grid-cathode circuit a first voltage varying from a value substantially more negative than said firing voltage at the beginning of each positive plate-cathode voltage half cycle toward said firing voltage over the duration of said half cycle, oscillator circuit means for generating an alternating voltage having a frequency which is a substantial multiple of the frequency of said alternating-current source, circuit means for connecting said output voltage of said oscillator means in series with said first voltage produced by said responsive means in said grid-cathode circuit of said gas discharge tube.

9. The control system as defined in claim 8 and further including means for varying the amplitude of the alternating voltage generated by said oscillator means.

10. Apparatus for controlling the current applied to a load device from an alternating-current source comprising in combination, at least one gas discharge tube having a plate-cathode circuit including in series therewith said load device and said alternating-current source, said tube being of the type having a control grid with a known grid voltage firing characteristic indicative of the grid voltage level required to fire said tube on each positive half-cycle of the voltage applied between its plate and cathode from said alternating current source, first grid input voltage means for applying to said grid a cyclic first voltage component varying in a positive direction continually throughout each cycle of positive plate-cathode voltage so as to gradually approach said firing voltage during said half cycle, a second grid input voltage means for superimposing upon said first voltage component a second voltage component comprising an alternating voltage of relatively high frequency as compared to the frequency of said alternating-current source, and means for varying the amplitude of the second voltage component to thereby vary the firing time of said tube in each said positive half cycle.

11. The apparatus of claim 10 wherein said second means includes a capacitor and a rectifier connected in series across said alternating current voltage source, means for connecting said capacitor in the grid-cathode circuit of said tube with a polarity connection causing said grid to be driven negative with respect to said cathode when said capacitor is charged through said rectifier on each negative-going excursion of said alternating current source.

References Cited in the file of this patent

UNITED STATES PATENTS

| | | |
|---|---|---|
| 2,217,443 | Hermann | Oct. 8, 1940 |
| 2,273,978 | Montgomery | Feb. 24, 1942 |
| 2,371,415 | Tolson | Mar. 13, 1945 |
| 2,629,849 | Barnes | Feb. 24, 1953 |
| 2,638,568 | Calosi | May 12, 1953 |
| 2,708,731 | Morel et al. | May 17, 1955 |